United States Patent [19]
Protz, Jr.

[11] Patent Number: 5,595,364
[45] Date of Patent: Jan. 21, 1997

[54] SUCTION CUP AND HANGER

[75] Inventor: William F. Protz, Jr., Lake Forest, Ill.

[73] Assignee: Santa's Best, Northfield, Ill.

[21] Appl. No.: 386,076

[22] Filed: Feb. 9, 1995

[51] Int. Cl.$^6$ ................................................ F16B 47/00
[52] U.S. Cl. ........................ 248/205.5; 248/206.1; 248/206.2; 248/304
[58] Field of Search ................ 248/205.5, 206.2, 248/206.1, 301, 303, 304

[56] References Cited

U.S. PATENT DOCUMENTS

| | | |
|---|---|---|
| D. 313,660 | 1/1991 | Adams. |
| 840,618 | 1/1907 | Golombek ............... 248/205.5 |
| 968,068 | 8/1910 | McClelland, Jr. ........ 248/205.2 |
| 1,533,136 | 4/1925 | Phelps ..................... 248/205.5 |
| 2,145,836 | 1/1939 | Parkins ................. 248/205.5 X |
| 4,848,713 | 7/1989 | Adams. |
| 5,028,026 | 7/1991 | Philipps et al. ........... 248/206.2 |
| 5,078,356 | 1/1992 | Adams. |
| 5,110,078 | 5/1992 | Gary. |

FOREIGN PATENT DOCUMENTS

| | | | |
|---|---|---|---|
| 5-220042A | 8/1993 | Japan .................... | 248/205.5 |
| 441647 | 1/1968 | Switzerland ............ | 248/206.1 |

*Primary Examiner*—Ramon O. Ramirez
*Assistant Examiner*—Michael J. Turgeon
*Attorney, Agent, or Firm*— Emrich & Dithmar

[57] ABSTRACT

A suction cup and hanger combination. The combination has suction cup with a flexible cup shaped member and mounting button or nub on one end thereof. A hanger having a hook at one end and mechanism at the other end for detachably mounting the hanger on the suction cup mounting button or nub. The hanger hook is laterally offset to position at least a portion of the hook substantially vertically under the suction cup mounting button or nub. The hook may have a bottom surface which is slanted to ensure that any ornament hung on the hook is vertically below the button or nub.

7 Claims, 1 Drawing Sheet

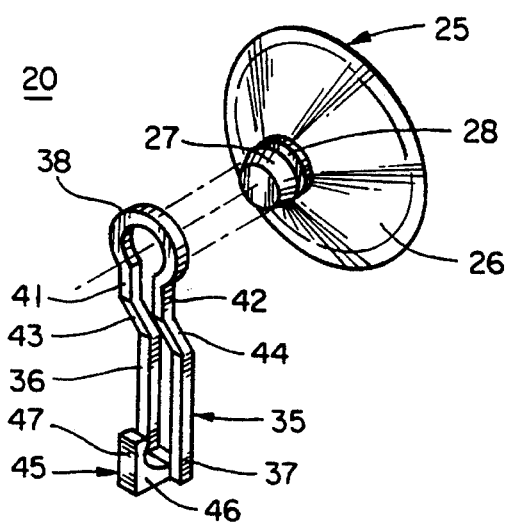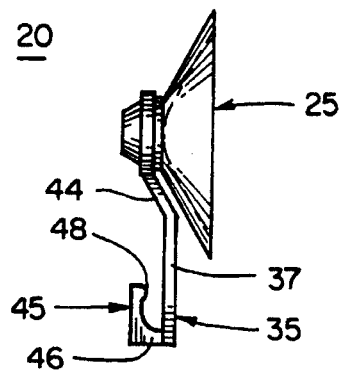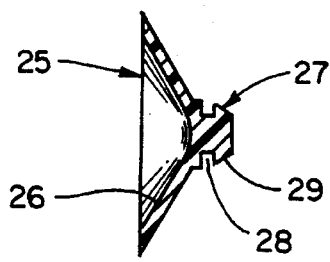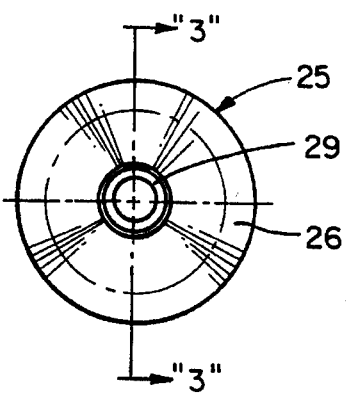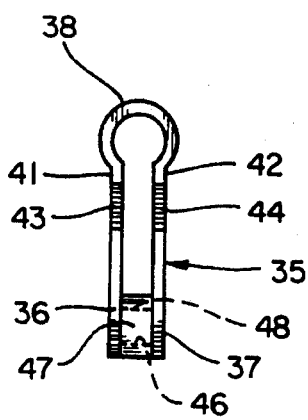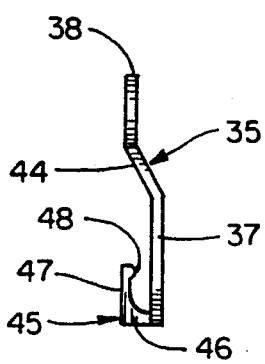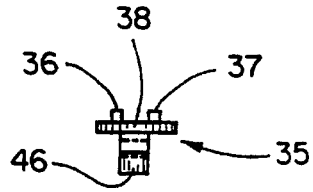

SUCTION CUP AND HANGER

BACKGROUND OF THE INVENTION

This invention relates to combination devices for holding decorative ornaments or other objects, and more particularly, to a decorative ornament and support assembly particularly adapted to be mounted on a relatively smooth, substantially planar surface such as glass or wood.

Gary U.S. Pat. No. 5,110,078 issued May 5, 1992 discloses a device for mounting a decorative light support assembly to a planar surface using a suction cup in a two-part combination. The Gary patent references a large number of patents and devices disclosed by Gary to this same general subject matter which are listed in the references on the front page of the '078 patent. A copy of that patent is submitted herewith in the enclosed Information Disclosure Statement.

Nevertheless, while the Gary patent may show a device which is satisfactory for its intended purpose, there is an inherent difficulty with the device of the Gary patent relating to the moment created by the construction between the suction cup there disclosed and the weight supported by the clip portion of the Gary device. This moment multiplied by the weight of the decorative light creates a force which tends to break the suction between the cup and the planar support surface, thereby rendering the device ineffective.

The Gary patent also illustrates the advantage of suction cups over mounting devices including adhesive pads, screw type fasteners, or the like for securing support brackets to substantially planar surfaces. Adhesive pads as well as the other above-mentioned type fasteners leave evidence of their presence ranging from adhesive residue to actual holes in the surface. All of these objections are obviated by the use of suction cups for mounting devices to flat planar surfaces.

SUMMARY OF THE INVENTION

According to the present invention, a suction cup and hanger combination is provided that comprises a suction cup member and a hanger member. The suction cup member is preferably molded from a flexible polymeric material such as a rubber or rubber modified plastic and the hanger is preferably molded from an injection moldable thermal plastic resin which may be an acrylic resin, a polycarbonate resin or any other suitable synthetic organic resin.

A principal object of the invention is to provide a combination in which the item to be hung from the hanger is as close to possible to be in vertical alignment with the rear portion of the suction cup in order to minimize the turning moment generated by the configuration, thereby reducing the force which pulls the suction cup from the support surface and tends to break the suction.

Another object of the invention is to provide a suction cup and hanger combination which is geometrically easy to construct yet provides great versatility in the items to be hung from the combination.

Yet another object of the invention is to provide a construction which is relatively inexpensive to make, yet performs its purpose in a superior manner than assemblies hereto commercially available.

The invention consists of certain novel features and a combination of parts hereinafter fully described illustrated in the accompanying drawings and particularly pointed out in the appended claims it being understood that various changes in the details may be made without departing from the spirit or sacrificing any of the advantages of the present invention.

BRIEF DESCRIPTION OF THE DRAWINGS

FIG. 1 is an exploded perspective view of the suction cup and hanger which forms the combination of the present invention;

FIG. 2 is a side elevational view of the combination shown in Fig. 1 in the assembled condition thereof;

FIG. 3 is a sectional view of the suction cup illustrated in Fig. 4;

FIG. 4 is a rear elevational view of the suction cup illustrated in FIG. 2;

FIG. 5 is a rear elevational view of the hanger forming a portion of the combination illustrated in FIGS. 1 and 2;

FIG. 6 is a side elevational view of the hanger illustrated in FIG. 5; and

FIG. 7 is a top view of the hanger illustrated in FIG. 5.

DESCRIPTION OF THE PREFERRED EMBODIMENT

Referring to the drawings, there is disclosed a combination device 20 which includes a suction cup 25 and a hanger 35. The suction cup 25 includes the usual flexible cup portion 26 having a boss 27 extending rearwardly of the cup portion 26. The boss 27 includes a frustrum portion 29 which defines a circular groove 28 with the back of the flexible cup portion 26, as best seen in FIG. 3.

The hanger 35 includes a pair of spaced apart generally parallel long arm portions 36 and 37 which extend vertically upwardly and terminate in an arcuate mounting portion 38. The arcuate mounting portion 38 is laterally offset with respect to the arms 36 and 37 due to a pair of short parallel vertical arms 41 and 42 extending from the ends of the arcuate portion 38 which are interconnected to the long arms 36 and 37, respectively, by a pair of transition or offset arm portions 43 and 44. The hanger construction 35 is completed by hook 45 having a slanted support 46 which interconnects the arms 36 and 37 and a vertical portion 47 which terminates in an inwardly extending tab 48. The slanted support is higher at the intersection with vertical portion 47 at the juncture with the arms 36 and 37, for a purpose to be explained.

As may be seen from the drawings, the interconnection of the slanted support portion 46 with the arms 36 and 37 adds rigidity to the hanger 35 and maintains an ornament in contact therewith positioned toward the arms 36 and 37. The offset portions 43 and 44 serve to position the arms 36 and 37 very close to the planar support surface to which the suction cup 25 is mounted so as to reduce and substantially eliminate any movement generated due to the horizontal distance between the support surface to which the suction cup 25 is mounted and the center of gravity of an ornament or the like which is hung on the hook 45 and adjacent to or in contact with the arms 36 and 37 due to the slanted support 46.

Another feature of the invention is the boss 27 extending rearwardly of the suction cup 25 facilitating prevents an easy exchange of hangers 35 when it is desired to provide hangers of somewhat different geometries; however, it is an important feature of the present invention that a hanger which, for instance, may be substantially longer than that shown in the drawings without departing from the scope of the invention include the transition or offset arms 43 and 44. The length of the offset arms 43 and 44 may be somewhat longer depending upon the depth of the suction cup 25, it being understood that the deeper the suction cup 26, the longer the arms 43 and 44 may have to be.

Preferably, the hanger 35 may be made of a suitable synthetic organic resin such as an acrylic or carbonate material or for that matter nylon, polyethylene or various mixtures thereof. It is important that the synthetic organic resin of the hanger 35 have sufficient strength to carry whatever ornament is eventually hung onto the hook portion 45. The tab 48 serves to retain the item held on the hook 45 in place. This can be garland or an ornament. Any type or variety of objects can be hung on the hook 45 if desired, it being outside the scope of the invention.

While there has been disclosed what is considered to be the preferred embodiment of the present invention it is understood that various changes in the details may be made without departing from the spirit or sacrificing any of the advantages of the present invention.

I claim:

1. A suction cup and hanger combination, comprising a suction cup having a flexible cup shaped member with mounting means on one end thereof, a hanger having a hook at one end and mechanism at the other end for detachably mounting said hanger on said suction cup mounting means, said hanger hook being laterally offset to position at least a portion of said hook substantially vertically under said suction cup mounting means and having a surface urging an object supported thereon toward said suction cup.

2. The combination of claim 1, wherein said suction cup mounting means is integral with said suction cup.

3. The combination of claim 2, wherein said suction cup mounting means is a flexible button shaped member extending rearwardly from said suction cup forming a groove to receive said hanger.

4. The combination of claim 1, wherein said hanger is a synthetic organic resin.

5. The combination of claim 4, wherein said hanger includes spaced apart parallel arms interconnected at one end for detachably mounting said hanger on said suction cup.

6. The combination of claim 5, wherein said spaced apart parallel arms support a hook at the other end thereof, said hook extending away from said arms in a direction opposite to said suction cup.

7. A suction cup and hanger combination, comprising a suction cup having a flexible cup shaped member with mounting means on one end thereof, a hanger having a hook at one end and mechanism at the other end for detachably mounting said hanger on said suction cup mounting means, said hanger hook being laterally offset to position at least a portion of said hook substantially vertically under said suction cup mounting means; and means for continually urging an ornament supported on said hanger hook toward said suction cup.

\* \* \* \* \*